United States Patent [19]

Arima

[11] Patent Number: 4,652,979

[45] Date of Patent: Mar. 24, 1987

[54] LAMP ASSEMBLY FOR EMITTING A BEAM OF LIGHT AT AN ANGLE TO ITS OPTICAL AXIS

[75] Inventor: Kenji Arima, Shizuoka, Japan

[73] Assignee: Koito Seisakusho Co., Ltd., Tokyo, Japan

[21] Appl. No.: 779,641

[22] Filed: Sep. 24, 1985

[30] Foreign Application Priority Data

Nov. 21, 1984 [JP] Japan .......................... 59-175717[U]

[51] Int. Cl.[4] .......................... B60Q 1/00; F21V 5/00

[52] U.S. Cl. ........................................ 362/80; 340/87; 362/268; 362/309; 362/331

[58] Field of Search ............... 362/309, 331, 333, 339, 362/80, 61, 268, 307, 308, 326; 340/87, 74, 91, 92; 350/411, 431

[56] References Cited

U.S. PATENT DOCUMENTS

| | | | |
|---|---|---|---|
| 3,436,758 | 4/1969 | Kluth | 340/376 |
| 3,517,384 | 6/1970 | Jablonski | 340/83 |
| 4,158,222 | 6/1979 | Cook | 362/309 |
| 4,463,411 | 7/1984 | Proctor | 362/61 |
| 4,488,141 | 12/1984 | Ohlenforst et al. | 340/87 |
| 4,542,448 | 9/1985 | Yamai et al. | 362/331 |
| 4,577,260 | 3/1986 | Tysoe | 362/300 |

FOREIGN PATENT DOCUMENTS

| | | | |
|---|---|---|---|
| 788420 | 10/1935 | Italy | 362/268 |
| 521558 | 3/1955 | Italy | 362/268 |
| 157070 | of 1921 | United Kingdom | 362/268 |
| 408113 | 4/1934 | United Kingdom | 362/309 |

*Primary Examiner*—William A. Cuchlinski, Jr.
*Assistant Examiner*—D. M. Cox
*Attorney, Agent, or Firm*—Browdy and Neimark

[57] ABSTRACT

A lamp assembly is disclosed as adapted for use as a supplemental high mounted stop lamp to be installed just interiorly of a steeply slanting rear window of a motor vehicle. A lamp housing has a light source disposed therein, and two generally planar lens members are mounted at the open front end of the lamp housing in parallel spaced relation to each other. The inner lens member is configured to provide a Fresnel lens effective to render the light rays from the source parallel to the principal axis of the lamp assembly, thereby superseding the paraboloidal reflector heretofore employed to the same end. The outer lens member has a plurality of prismatic lens segments for internally reflecting the parallel rays from the inner lens member in a predetermined direction at a considerable angle to the lamp assembly axis. Preferably, the two lens members are further so molded as to impart both lateral and vertical divergence to the light beam emitted by the lamp assembly.

11 Claims, 6 Drawing Figures

LAMP ASSEMBLY FOR EMITTING A BEAM OF LIGHT AT AN ANGLE TO ITS OPTICAL AXIS

BACKGROUND OF THE INVENTION

Our invention relates to lamps in general and, in particular, to a lamp assembly capable of throwing a beam of light in a preassigned direction at a considerable angle to its optical axis. The lamp assembly in accordance with our invention lends itself to use as, typically, a supplemental high mounted stop lamp on motor vehicles.

As the name implies, supplemental high mounted stop lamps are additional lamps of a vehicular stop lamp system that are mounted high, and typically interiorly of the vehicle rear window, for giving a steady warning light through intervening vehicles to operators of following vehicles. Some motor vehicles today, passenger cars in particular, have their rear windows arranged a considerable angle out of the perpendicular from hydrodynamic considerations or design preferences. In mounting supplemental stop lamps interiorly on such a steeply slanting vehicle rear window, it is desired that their seating plane be parallel to the window. So mounted, the stop lamps must of course emit beams of light at a considerable angle to their seating plane.

A typical conventional supplemental stop lamp intended for such use includes a lamp body to be mounted with its axis oriented horizontally with its sloping front end held interiorly against the vehicle rear window. The lamp body has at its rear end a paraboloidal reflector for producing parallel rays of light from a bulb positioned at its focus. Mounted at the open front end of the lamp body is a generally planar lens which is laid parallel to the vehicle rear window and so at a great angle to the lamp axis. The lens has a multiplicity of diverging lens segments molded in one piece for diverging the parallel light rays both laterally and vertically, in order that the resulting beam may cover a sufficiently wide area to the rear of the vehicle.

We object to this prior art stop lamp by reason of first of all, its bulk. The stop lamp must have a vertical dimension, at right angles with its optical axis, of not less than a prescribed limit to give a required degree of beam intensity. Because of the slanting rear window, however, the desired vertical dimension has been gained only by correspondingly increasing the lens dimension in the height direction of the lamp parallel to the window. This in turn has required an increase in the axial dimension of the lamp body, resulting in the inconvenient bulging of the lamp body toward the interior of the vehicle.

In addition to such mechanical or dimensional difficulties, the prior art stop lamp has had an optical problem as well. The parallel rays of light produced by the paraboloidal reflector are rendered divergent as aforesaid by the multiple lens segments which are molded in one piece as the generally planar lens member mounted at the slanting front end of the lamp body. The slant of the lens member with respect to the optical axis of the lamp assembly has been such that no negligible proportion of the parallel light rays from the reflector has been reflected away therefrom, instead of traversing same thereby to be diverged for beam coverage over a greater area.

We have proposed in our U.S. patent application Ser. No. 733,573, filed May 13, 1985, an improved lamp assembly designed to remedy these problems. This prior suggested lamp assembly comprises a lamp body having a paraboloidal reflector for producing parallel light rays from a bulk mounted at its focus, and two generally planar lens members disposed one behind the other at the front end of the lamp body so as to be normal to the principal axis of the lamp assembly. The inner lens member functions to diverge the parallel light rays laterally (or vertically) whereas the outer lens member serves to diverge the incident rays vertically (or horizontally) and to reorient the rays in a predetermined direction at an angle to the lamp axis.

The above lamp assembly of our prior application offers definite advantages over the more conventional ones. Since the lamp axis is perpendicular to the two lens members, as well as to the vehicular rear window, the axial dimension of the lamp assembly can be reduced to a minimum. Further the parallel light rays produced by the paraboloidal reflector can all traverse the two lens members to be emitted in the desired direction without energy loss.

We have found some weaknesses in this prior application, however, arising from the use of the paraboloidal reflector. The paraboiloidal reflector reflects not only the light energy from its source but also the heat generated thereby. The result is the excessive temperature rise of the lens system, particularly the inner lens member, to the detriment of its essential qualities. The avoidance of this problem by spacing the lens system a greater distance away from the reflector is objectionable as the axial dimension of the lamp system would increase correspondingly. We also object to the paraboiloidal reflector because it is expensive; the total cost of the lamp assembly will be reduced substantially without it. From the standpoint of lamp design, too, the paraboloidal reflector determines the shape of the rear portion of the lamp body, which is the most conspicuous part of the stop lamp as seen from inside the motor vehicle. The elimination of the paraboloidal reflector will give greater latitude to the lamp designer.

SUMMARY OF THE INVENTION

We have hereby succeeded in eliminating the paraboloidal reflector from the lamp assembly of the type defined, the resulting lamp assembly being smaller in axial dimension, and, nevertheless, less susceptible to the undue temperature rise of the lens system, than heretofore.

Stated in its simplest form, the lamp assembly in accordance with our invention comprises a generally planar inner lens member and a generally planar outer lens member disposed parallel to each other and normal to the optical axis of the lamp assembly. The inner lens member is configured to provide a Fresnel lens for making the rays of light from a source parallel to each other. Disposed externally of the inner lens member, the outer lens member is formed to include a plurality or multiplicity of prismatic lens segments whereby the incident light rays are reflected in a predetermined direction at an angle to the axis of the lamp assembly.

Thus, in the improved lamp assembly of our present invention, the Fresnel lens of the inner lens member serves the purpose of the conventional paraboloidal reflector, so that the conventional lamp body with the internal paraboloidal reflector is unnecessary. Of course, in place of the lamp body, there may be employed a lamp housing having the light source mounted therein and having its front end closed by the two lens members. The lamp housing literally serves as such, so that it can be of any shape as long as it can accommodate the light source without any excessive temperature rise. The axial dimension of the complete lamp assembly, including the lamp housing, can be much less than that of our prior application for a given output light intensity and for throwing a beam of light at a given angle to the principal axis.

As an additional advantage, the lens system of the lamp assembly in accordance with our invention lends itself to ready adaptation for making the light beam divergent in both lateral and horizontal directions. In one embodiment disclosed herein, the inner lens member is formed to include a set of lens segments, in addition to the Fresnel lens, for diverging the rays in one of the orthogonal directions, and the outer lens member is formed to include another set of lens segments, in addition to the prismatic lens segments, for diverging the rays in the other direction. Another embodiment is disclosed wherein the outer lens member has no additional set of lens segments but has its prismatic lens segments convexed for diverging the rays in the required direction.

The above and other features and advantages of this invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
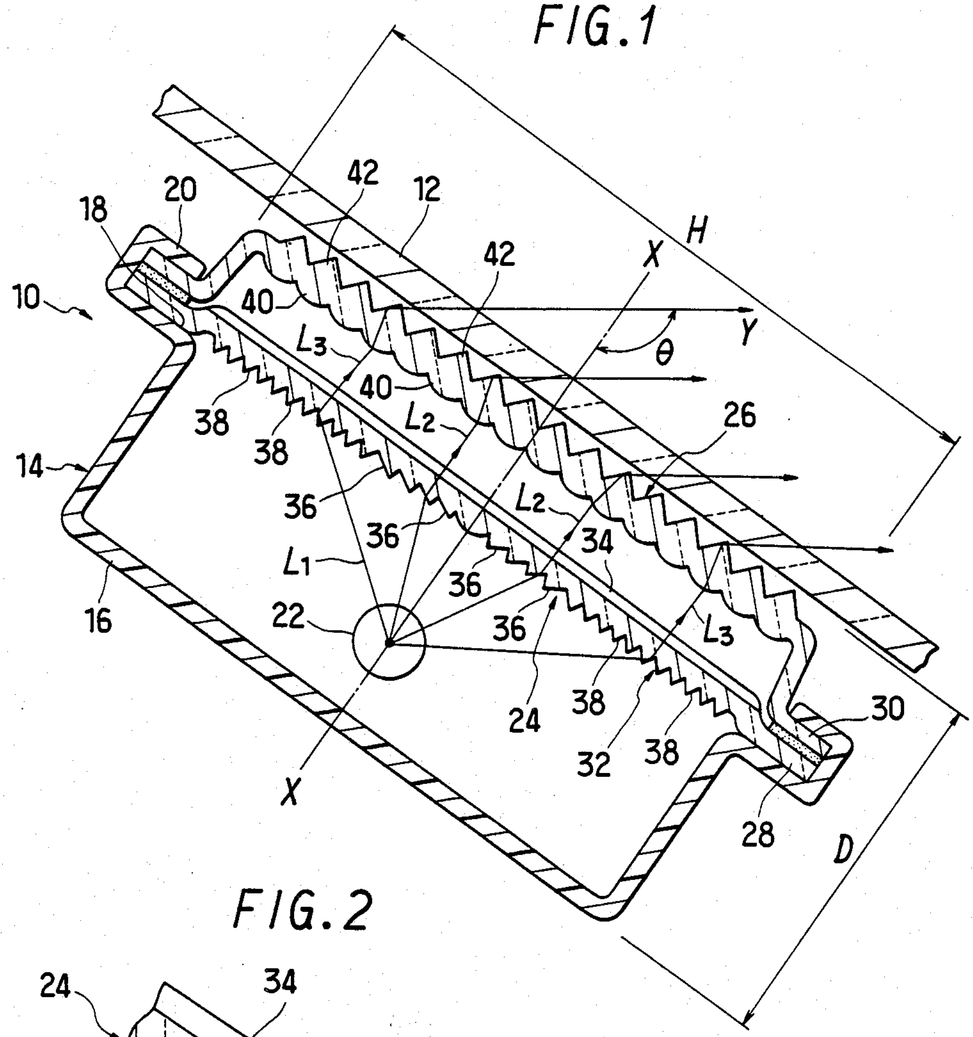
FIG. 1 is an axial section through a preferred form of the lamp assembly constructed in accordance with the novel concepts of our invention, the lamp assembly being herein shown as typified by a supplemental high mounted stop lamp mounted in place on a vehicular rear window.

We will now describe our invention as embodied in supplemental high mounted stop lamps on motor vehicles. The supplemental stop lamp of FIG. 1 is generally designated 10 and therein shown mounted internally of a sloping pane or panel 12 of glass or like material of a vehicular rear window. The stop lamp 10 includes a lamp housing 14 having a closed rear end 16, directed away from the windowpane 12, and an open front end 18 complete with a mounting flange 20 of U shaped cross section. Mounted within the lamp housing 14 is a light source such as a conventional bulb 22 which is located on the optical axis X—X of the stop lamp 10. This optical axis is set at a prescribed angle $\theta$ to the predetermined direction Y to the rear of the vehicle in which the stop lamp 10 is to throw a beam of light.

An inner lens member 24 and outer lens member 26, both of generally planar shape, are mounted at the open front end 18 of the lamp housing 14, with the outer lens member disposed exteriorly of the inner lens member and held opposite the windowpane 12. The two lens members 24 and 26 have marginal edge portions 28 and 30, respectively, which are both snugly caught in the U shaped mounting flange 20 of the lamp housing 14. So mounted, the lens members 24 and 26 are disposed perpendicular to the optical axis X—X approximately parallel to the windowpane 12.

Figure 2:
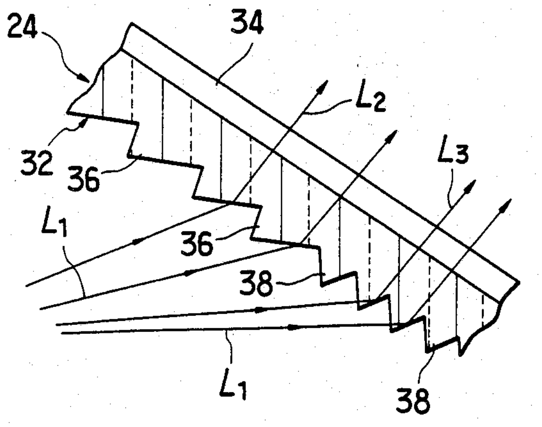
FIG. 2 is an enlarged, fragmentary axial section through the inner lens member of the supplemental stop lamp of FIG. 1, the view being explanatory of the optical performance of the Fresnel lens on the inner lens member.
Figure 3:
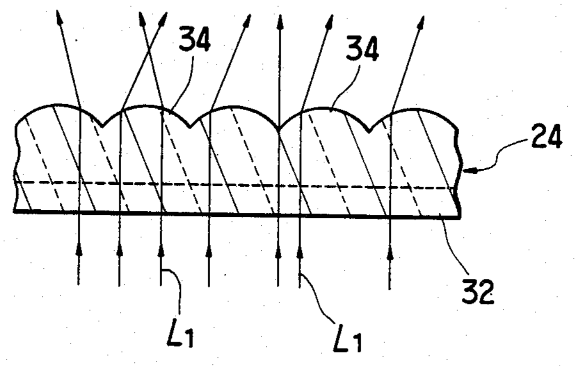
FIG. 3 is also an enlarged fragmentary section through the inner lens member of the stop lamp of FIG. 1, taken along a plane at right angles with the plane of FIG. 2 and being explanatory of the optical performance of the divergent lens segments on the inner lens member.

As will be seen from both FIGS. 1, 2 and 3, the inner lens member 24 is a one piece molding of glass or like material, comprising a Fresnel lens 32 on its inside surface, directed toward the light source 22, and a plurality or multiplicity of divergent lens segments 34 on its outside surface directed away from the light source. The Fresnel lens 32 is composed of a set of refractive lens segments 36 occupying the central portion of the inner lens member 24, and a set of reflective lens segments 38 surrounding the set of refractive lens segments. All the segments 36 and 38 of the Fresnel lens 32 are concentric about the optical axis X—X. The light source 22 is at the focus of the Fresnel lens 32, so that the light rays emitted by this light source are rendered parallel to the optical axis by the constituent segments 36 and 38 of the Fresnel lens, as will be later explained in more detail.

The divergent lens segments 34 on the outside surface of the inner lens member 24 take the form of parallel ridges of convex cross section extending in the top to bottom height direction of the stop lamp 10. The lens segments 34 are effective to diverge the parallel light rays from the Fresnel lens 32 in a horizontal or lateral direction.

Figure 4:
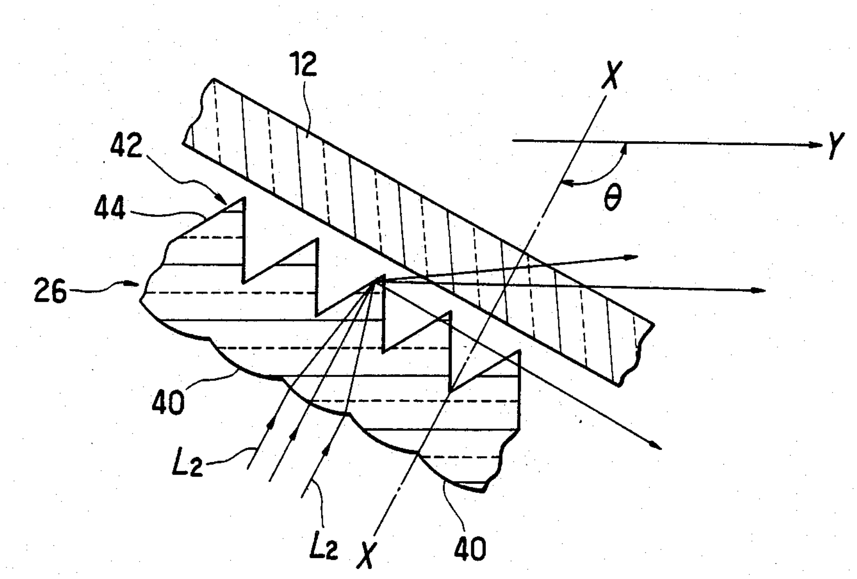
FIG. 4 is an enlarged, fragmentary section through the outer lens member of the stop lamp of FIG. 1, taken along the same plane as with FIG. 1 and being explanatory of the optical performance of the divergent lens segments and prismatic lens segments on the outer lens member.

As shown on enlarged scale in FIG. 4, the outer lens member 26 is also a one piece molding of glass or like material having a plurality or multiplicity of divergent lens segments 40 on its inside surface, directed toward the inner lens member 24, and a plurality or multiplicity of prismatic lens segments 42 on its outside surface directed toward the windowpane 12. The divergent lens segments 40 are similar in shape to the divergent lens segments 34 on the inner lens member 24 except that the former extend in the side to side transverse direction of the stop lamp 10. So arranged, the lens segments 40 function to diverge the incident light rays vertically.

The prismatic lens segments 42 on the outside surface of the outer lens member 26 take the form of double sloping ridges extending parallel to each other in the transverse direction of the stop lamp 10. One of the sloping, planar sides, located away from the beam direction Y and designated 44, is so angled as to internally reflect the light rays from the convergent lens segments 40 in the beam direction Y.

OPERATION

In the supplemental high mounted stop lamp 10 of the foregoing construction, the light rays sent forth by the bulb 22 are designated L1 in FIGS. 1 through 3. Part of the light rays L1 is rendered parallel to the optical axis X—X by refraction upon impinging on the central Fresnel lens segments 36 of the inner lens member 24, as indicated at L2 in FIGS. 1 and 2. The remainder of the light rays L1 falls on the peripheral Fresnel lens segments 38 of the inner lens member 24 and is thereby also made parallel to the optical axis X—X by internal reflection, as indicated at L3. Then, as best shown in FIG. 3, the parallel light rays are diverged in the lateral direction of the stop lamp 10 by the divergent lens segments 34 on the outside surface of the inner lens member 24.

The laterally diverging light rays L2 and L3 subsequently fall on the lens segments 40 on the inside surface of the outer lens member 26, thereby to be diverged vertically. Then the rays are internally reflected by the reflective surfaces 44 of the prismatic lens segments 42 on the outside surface of the outer lens member 26 at the angle $\theta$ to the optical axis X—X. The stop lamp 10 will then throw a beam of light, diverging both horizontally and vertically, in the predetermined direction Y.

Preferably, and as shown in FIG. 4, the lens segments 40 should be so configured as to converge the incident rays at their focuses located at or adjacent the reflective surfaces 44 of the prismatic lens segments 42 on the outside surface of the outer lens member 26. Then the light rays that have traversed the lens segments 40 will all fall on the proper reflective surfaces 44 of the prismatic lens segments 42 and will become divergent after having been reflected thereby. We call these lens segments 40 divergent, even though they actually converge the incident rays toward the noted focuses, because they are intended to make divergent the beam of light emitted by the stop lamp 10.

Thus, by mounting the stop lamp 10 with its optical axis X—X oriented approximately perpendicular to the plane of the windowpane 12, a divergent beam of light can be emitted in the desired direction Y at the predetermined angle to the lamp axis. The height dimension H of the stop lamp 10 can be made sufficiently great for required output candlepower without correpsondingly increasing its depth dimension D. Furthermore, with its depth dimension D minimized as above, the stop lamp 10 will not inconveniently protrude toward the interior of the vehicle if its rear window slopes very steeply.

The most pronounced feature of the stop lamp 10 resides, of course, in the Fresnel lens 32 on the inside surface of the inner lens member 24, which supersedes the lamp body with the conventional paraboloidal reflector. The lens system of this stop lamp is therefore far less likely to suffer thermal damage than that of the prior art. It will be seen that the lamp housing 14 serves merely to enclose the light source 22 and to hold the lens members 24 and 26 in place with respect to the light source. We have already set forth the advantages accruing from this second construction.

SECOND FORM

Figure 5:
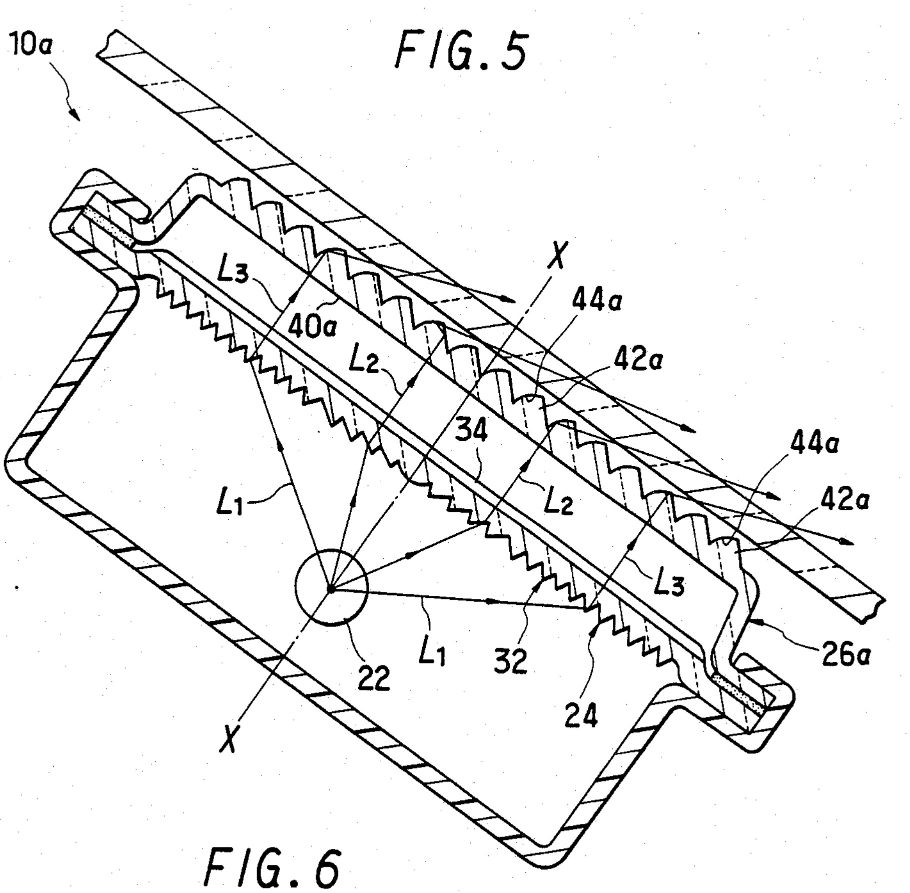
FIG. 5 is an axial section through another preferred example of supplemental high mounted stop lamp embodying our invention, the stop lamp being herein also shown mounted in position on a vehicular rear window.
Figure 6:
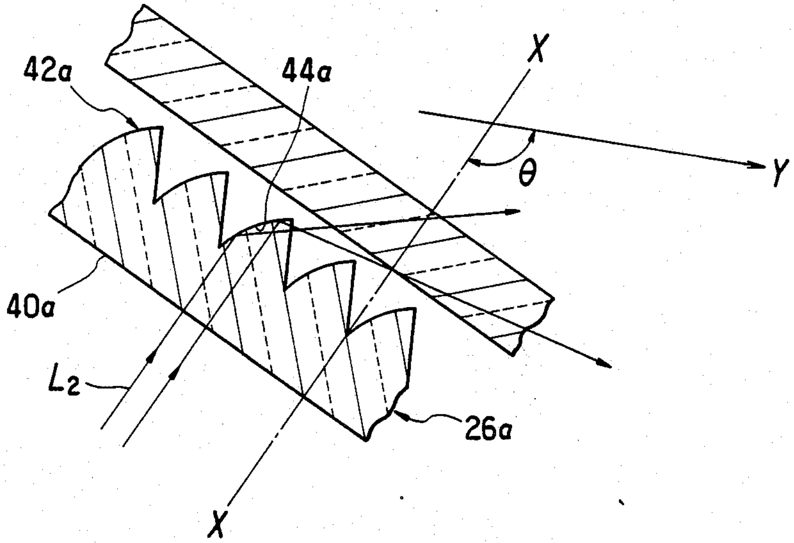
FIG. 6 is an enlarged fragmentary section through the outer lens member of the stop lamp of FIG. 5, taken along the same plane as with FIG. 5 and being explanatory of the optical performance of the convexed prismatic lens segments of the outer lens member.

The supplemental high mounted stop lamp **10*a* of FIG. 5 features an outer lens member 26*a* of different configuration from the outer lens member 26 of the above disclosed stop lamp 10. As shown on an enlarged scale in FIG. 6, the outer lens member 26*a* has its inside surface 40*a* shaped exactly flat, there being no vertically lens segments 40** of the previous embodiment.

Formed on the outside surface of the outer lens member **26*a* are a plurality or multiplicity of prismatic lens segments 42*a* in the form of double sloping ridges extending parallell to each other in the transverse direction of the stop lamp 10*a* as in the foregoing embodiment. However, the prismatic lens segments 42*a* differ from the lens segments 42 of the preceding embodiment in that the reflective surface 44*a* of each segment 42*a* is of convex cross section. A comparison of FIG. 5 with FIG. 1 will reveal that the stop lamp 10*a* is identical in the other details of construction with the stop lamp 10. We have therefore indicated the other pertinent parts of this stop 10*a* by the same reference numerals as those used to denote the correpsonding parts of the stop lamp 10**.

OPERATION OF SECOND FORM

It will be seen from FIG. 5 that the light rays L1 sent forth by the bulb 22 are rendered parallel to the optical axis X—X by the Fresnel lens 32 on the inside surface of the inner lens member 24, both by refraction and reflection. Then the parallel light rays are rendered laterally divergent by the lens segments 34 on the outside surface of the inner lens member 24. The laterally divergent light rays L2 and L3 from the inner lens member 24 subsequently traverse the planar inside surface **40*a* of the outer lens member 26*a*** without being optically affected in any substantial way in so doing.

Then the laterally divergent light rays L2 and L3 impinge on the convex reflective surfaces **44*a* of the prismatic lens segments 42*a* on the outside surface of the outer lens member 26*a*. The convex reflective surfaces 44*a* not only reflect the incident rays in the predetermined beam direction Y, at the angle $\theta$ to the lamp axis X—X, but also render the rays vertically divergent, as will be apparent from FIG. 6. Thus the stop lamp 10*a*** emits a beam of light, divergent both laterally and vertically, in the predetermined direction Y.

This stop lamp **10*a* offers the advantage that the outer lens member 26*a* need not be molded to include the divergent lens segments on its inside surface. The resulting configuration of the outer lens member 26*a* is much simpler than that of the outer lens member 26** of the prececing embodiment.

Although we have shown and described the improved lamp assembly of our invention in terms of but two preferable forms thereof and as adapted for use as supplemental high mounted stop lamps on motor vehicles, we wish to have it understood that such preferred forms are by way of example only and not to impose limitations upon our invention. The illustrated embodiments are, indeed, susceptible of a variety of modifications or alterations within the broad teaching hereof. For example, in the stop lamp 10 of FIG. 1 through 4, the laterally diverging lens segments 34 could be formed on the inside surface of the outer lens member 26, and the vertically diverging lens segments 40 on the outside surface of the inner lens member 24. Further the lamp assembly of our invention may be put to applications other than the supplemental high mounted stop lamp without departing from the scope of our invention.

We claim:

1. A lamp assembly for emitting a beam of light rays in a direction at a predetermined angle relative to its optical axis, the lamp assembly comprising:

(a) a light source for producing light;

(b) a generally planar inner lens member disposed perpendicular to the optical axis of the lamp assembly and configured to provide a Fresnel lens for making the rays of light from the light source parallel to the optical axis of the lamp assembly; and (c) a generally planar outer lens member disposed parallel to the inner lens member and farther away from the light source than the inner lens member, the outer lens member being formed to include a pluarlity of prismatic lens segments for reflecting substantially all of the incident light rays from the inner lens member in a direction parallel to the axis of said beam.

2. The lamp assembly as set forth in claim 1, wherein the Fresnel lens is formed on the inside surface, directed toward the light source, of the inner lens member, and wherein the inner lens member is further formed to include a plurality of diverging lens segments on its outside surface for diverging the parallel light rays in one of two orthogonal directions.

3. The lamp assembly as set forth in claim 2, wherein the diverging lens segments on the outside surface of the inner lens member are in the form of parallel ridges of convex cross section.

4. The lamp assembly as set forth in claim 2, wherein the prismatic lens segments are formed on the outside surface, directed away from the inner lens member, of the outer lens member, and wherein the outer lens member is further formed to include a plurality of diverging lens segments on its inside surface for diverging the incident light rays in the other of the two orthogonal directions.

5. The lamp assembly as set forth in claim 4, wherein the diverging lens segments on the inside surface of the outer lens member are in the form of parallel ridges of convex cross section.

6. The lamp assembly as set forth in claim 5, wherein each prismatic lens segment includes a pair of oppositely sloping sides one of which serves as a reflective surface for internally reflecting the incident light rays in the predetermined direction, and wherein each diverging lens segment on the inside surface of the outer lens member has a focus located adjacent the reflective surface of one of the prismatic lens segments.

7. The lamp assembly as set forth in claim 2, wherein the prismatic lens segments are formed on the outside surface, directed away from the inner lens member, of the outer lens member and are in the form of parallel ridges extending at right angles with the diverging lens segments on the outside surface of the inner lens member and each being of substantially triangular cross section having a pair of sloping sides one of which serves as a reflective surface for internally reflecting the incident light rays in the predetermined direction, the reflective surface of each prismatic lens segment being of convex cross section for diverging the incident light rays in a second direction at right angles with said one direction.

8. A high mounted supplemental stop lamp assembly for installation close to a relatively steeply slanting vehicular rear window for throwing a beam of light rays in a direction at a predetermined angle relative to the plane of the vehicular rear window, the lamp assembly comprising:

(a) a lamp housing having an open front end and adapted to be mounted interiorly of the vehicular rear window with its open front end directed toward said window;

(b) a light source mounted within the lamp housing for emitting light rays;

(c) a generally planar inner lens member mounted at the open front end of the lamp housing so as to be parallel to the vehicular rear window, the inner lens member being configured to provide a Fresnel lens for passing therethrough the light rays from the light source to provide parallel light rays normal to the plane of said rear window; and (d) a generally planar outer lens member mounted at the front end of the lamp housing and exteriorly of the inner lens member in parallel relation thereto, the outer lens member being formed to include a plurality of prismatic lens segments on its outside surface, said prismatic lens segments being so formed as to reflect substantially all of the incident light rays from said inner lens member in directions parallel to the axis of said beam.

9. The lamp assembly as set forth in claim 8, wherein the Fresnel lens is formed on the inside surface, directed toward the light source, of the inner lens member, wherein the inner lens member is further formed to include a plurality of diverging lens segments on its outside surface for diverging the parallel light rays in either of two orthogonal directions, and wherein the outer lens member is adapted to diverge the incident light rays in the other of the orthogonal directions.

10. The lamp assembly as set forth in claim 9, wherein the outer lens member is formed to include a plurality of diverging lens segments on its inside surface for diverging the incident light rays in said other of the orthogonal directions.

11. The lamp assembly as set forth in claim 9, wherein the prismatic lens segments are in the form of parallel ridges extending at right angles with the diverging lens segments on the outside surface of the inner lens member and are each of substantially triangular cross section having a pair of sloping sides one of which serves as the reflective surface, the reflective surface of each prismatic lens segment being of convex cross section for diverging the incident light rays in said other of the orthogonal directions.

* * * * *